May 16, 1961 S. J. TESTAGROSSA 2,984,128
MACHINE FOR MILLING TEETH
Filed Aug. 20, 1959 4 Sheets-Sheet 1

INVENTOR
SAMUEL J. TESTAGROSSA

ATTORNEY

May 16, 1961

S. J. TESTAGROSSA 2,984,128

MACHINE FOR MILLING TEETH

Filed Aug. 20, 1959

INVENTOR
SAMUEL J. TESTAGROSSA by Charles R. Fay,

ATTORNEY

May 16, 1961 S. J. TESTAGROSSA 2,984,128
MACHINE FOR MILLING TEETH
Filed Aug. 20, 1959 4 Sheets-Sheet 3
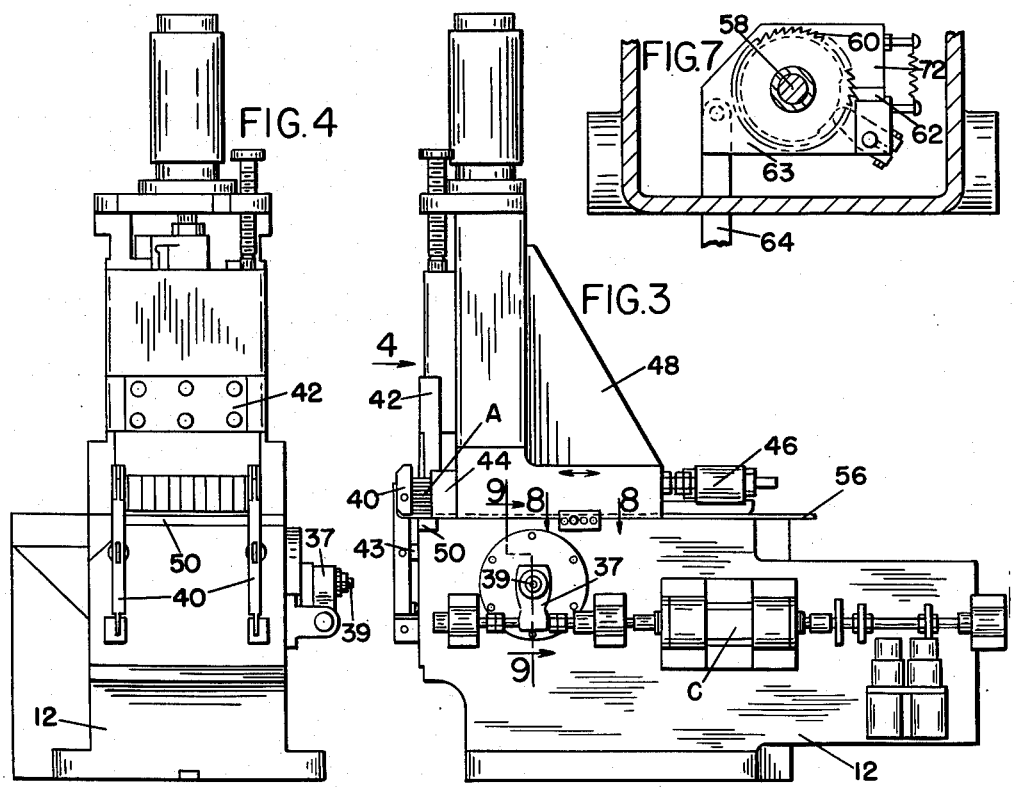
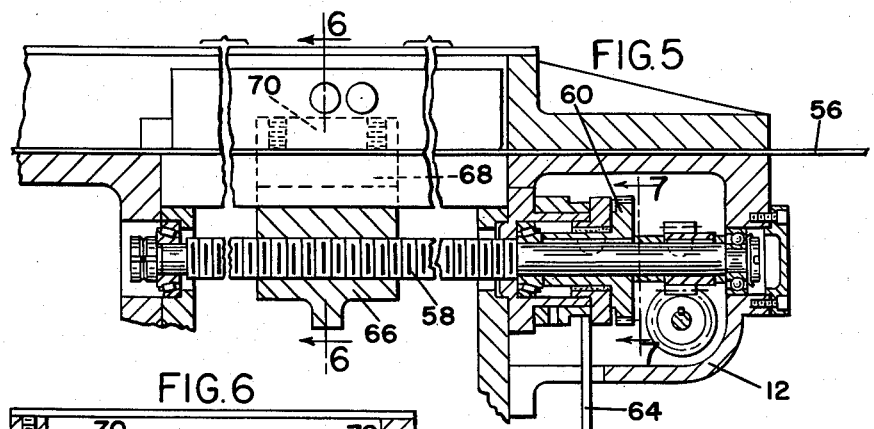
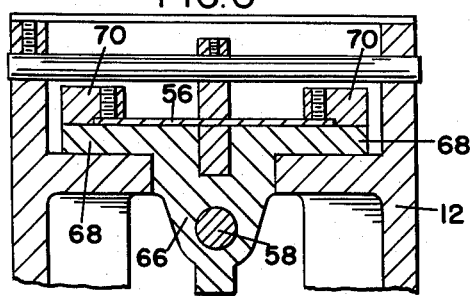
INVENTOR
SAMUEL J. TESTAGROSSA
by Charles R. Fay
ATTORNEY May 16, 1961 S. J. TESTAGROSSA 2,984,128
MACHINE FOR MILLING TEETH
Filed Aug. 20, 1959 4 Sheets-Sheet 4
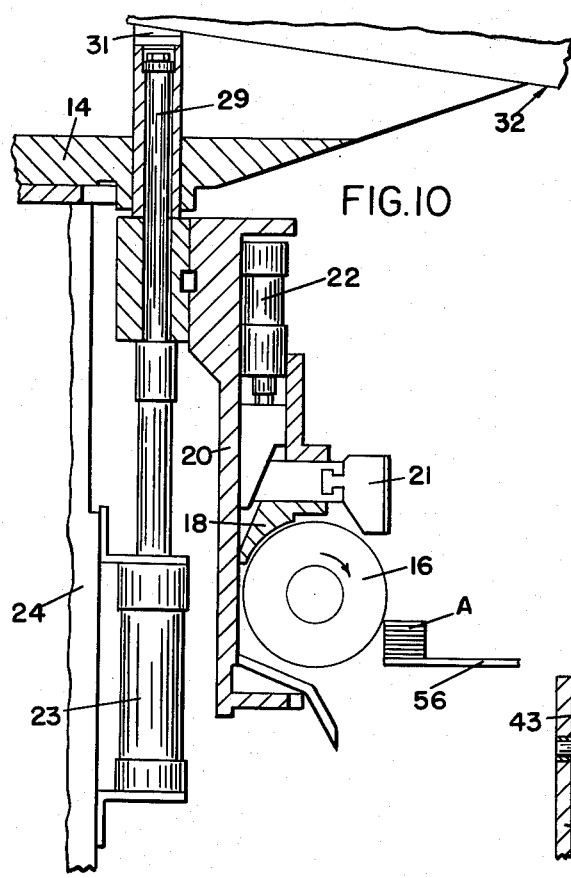
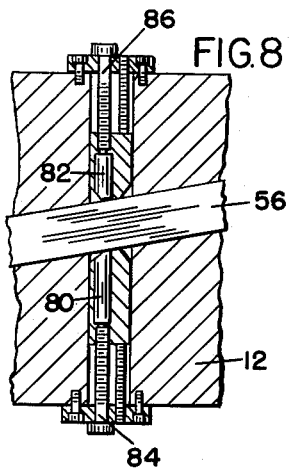
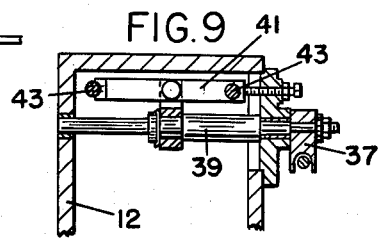
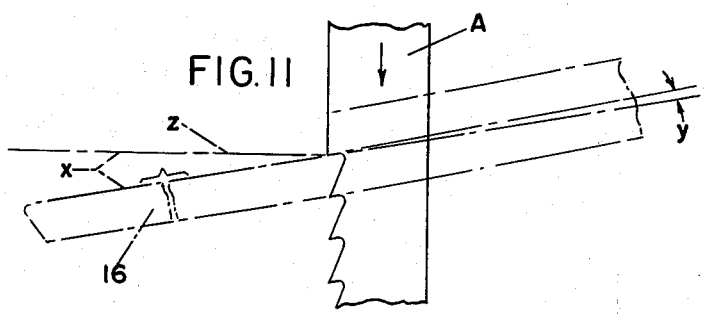
INVENTOR
SAMUEL J. TESTAGROSSA
ATTORNEY

United States Patent Office 2,984,128
Patented May 16, 1961

2,984,128
MACHINE FOR MILLING TEETH

Samuel J. Testagrossa, Fitchburg, Mass., assignor to Fitchburg Engineering Corporation, Fitchburg, Mass., a corporation of Massachusetts Filed Aug. 20, 1959, Ser. No. 837,315

11 Claims. (Cl. 76—41)

This invention relates to a new and improved milling machine for forming band saw teeth and the like, and the particular invention herein is adapted for use with a climb milling machine. The principal object of the invention resides in the provision of milling a stack of blanks to form the teeth therein substantially simultaneously in one pass of the milling cutter, and at the same time preventing any injury, burring, bending or distortion of the blanks and more particularly of the milled teeth being formed.

The band saw blanks are arranged in a stack, and they are milled by passing a cutter transversely of the stack at corresponding edges thereof while the blanks are clamped in position. During the milling operation, some of the blades, particularly the one at the bottom of the stack which receives the thrust of the milling cutter, may be distorted, bent, burred, and otherwise disturbed in such a way as to require providing for subsequent operations to de-burr or flatten the blades to cause the teeth to remain co-planar with the blank, until set and sharpened.

It is a principal object of the present invention to provide new and improved means for avoiding this distortion. Further objects of the invention include the provision of a climb milling machine for operating upon a stack of band saw blades or the like, and using a rotary cutter which mills a plurality of teeth at one time at one pass, and including means for adjusting the angularity of the axis of the cutter with respect to the position of the stack of band saw blades and particularly with respect to the direction of in-feed thereof, so as to provide any conventional angularity of the teeth, particularly hooked teeth, with respect to the longitudinal axis of the blade itself. This angle is ordinarily anywhere from one to ten degrees and provides an overhang or hook as is commonly desired in cutting band saw blades, particularly for woodsawing; and the provision of a saw tooth milling machine as above recited including the provision of a means for preventing burring or distortion of the lowermost blade or initial blade in a stack of blades which receives the thrust in unsupported relation of the milling cutter, and said means being set at an angle of one degree more than the maximum adjustment of the milling cutter, so that under all conditions and situations, the burr-preventing means will be adequately operative with a safety factor of one degree involved.

Another object of the invention resides in the provision of a milling machine as above described in combination with a burr plate set at an angle to the line of feed of the blank feeding into the saw milling machine, said burr plate underlying the stack of blades which is preferably provided in a vertical arrangement with the climb milling machine rising vertically to make the cut and thus providing a thrust on the lowermost blade in the stack of blades, the burr plate taking this thrust and preventing any distortion of the points of the teeth; and the provision of a burr plate in combination with a band saw milling machine as above described in which the burr plate is indexed forwardly a small amount at each pass of the milling cutter in order always to provide a complete and adequate support for all points which are being milled, and particularly with respect to the points of the teeth.

The invention further relates to arrangements and combinations of parts which will be hereinafter described and more particularly set forth in the appended claims.

Reference is to be had to the accompanying drawings, in which

Fig. 3 is a view in side elevation illustrating the clamp for the blades;

Fig. 4 is a view in elevation, looking in the direction of arrow 4 in Fig. 3;

Fig. 5 is a sectional view illustrating the feed of the burr plate;

Fig. 6 is a section on line 6—6 of Fig. 5;

Fig. 7 is a section on line 7—7 of Fig. 5;

Fig. 8 is a horizontal section on line 8—8 of Fig. 5;

Fig. 9 is a vertical section on line 9—9 of Fig. 3;

Fig. 10 is a diagrammatic view of the cutter, a stack of blades and the burr plate, and certain of the mechanism to cause raising and lowering of the blade; and Fig. 11 is a diagrammatic view showing the one degree relationship between the cutter and burr plate.

Figure 1:
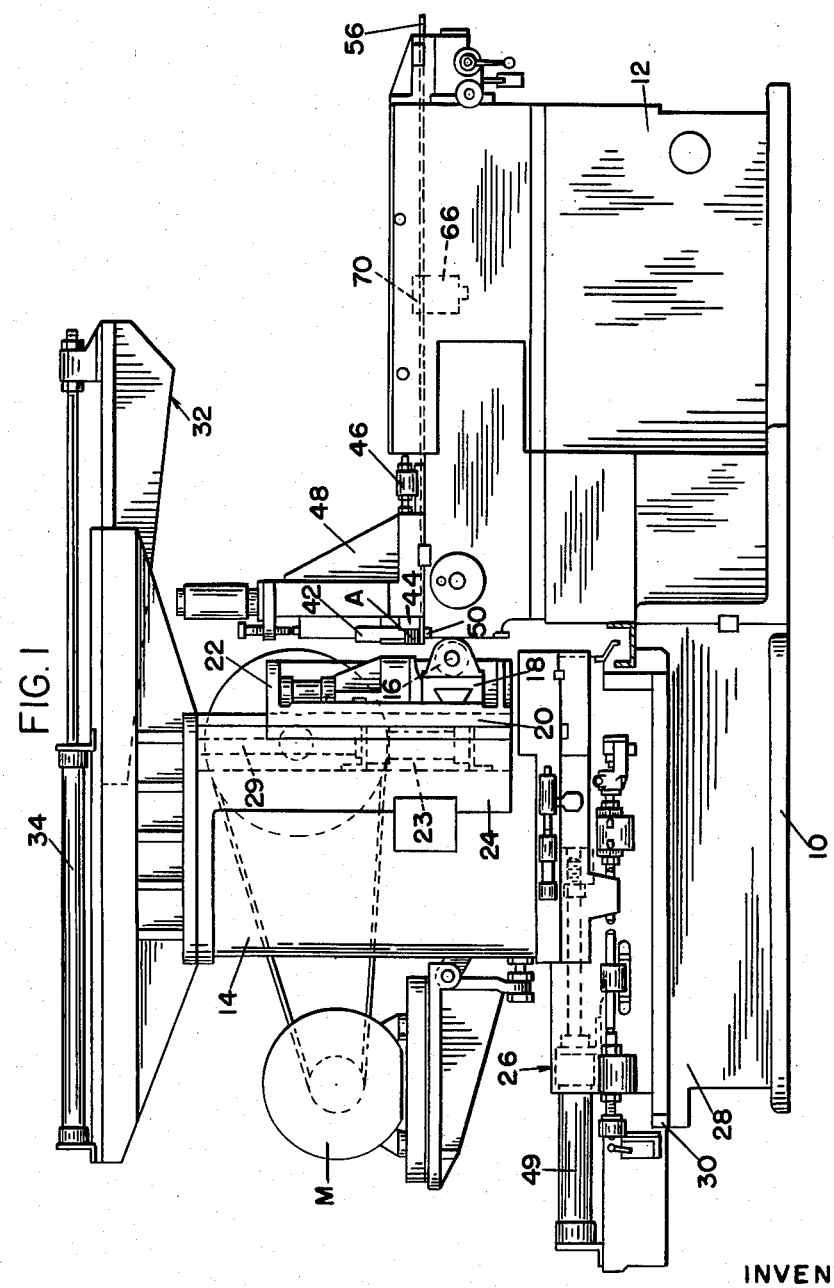
Fig. 1 is a view in side elevation illustrating the machine.
Figure 2:
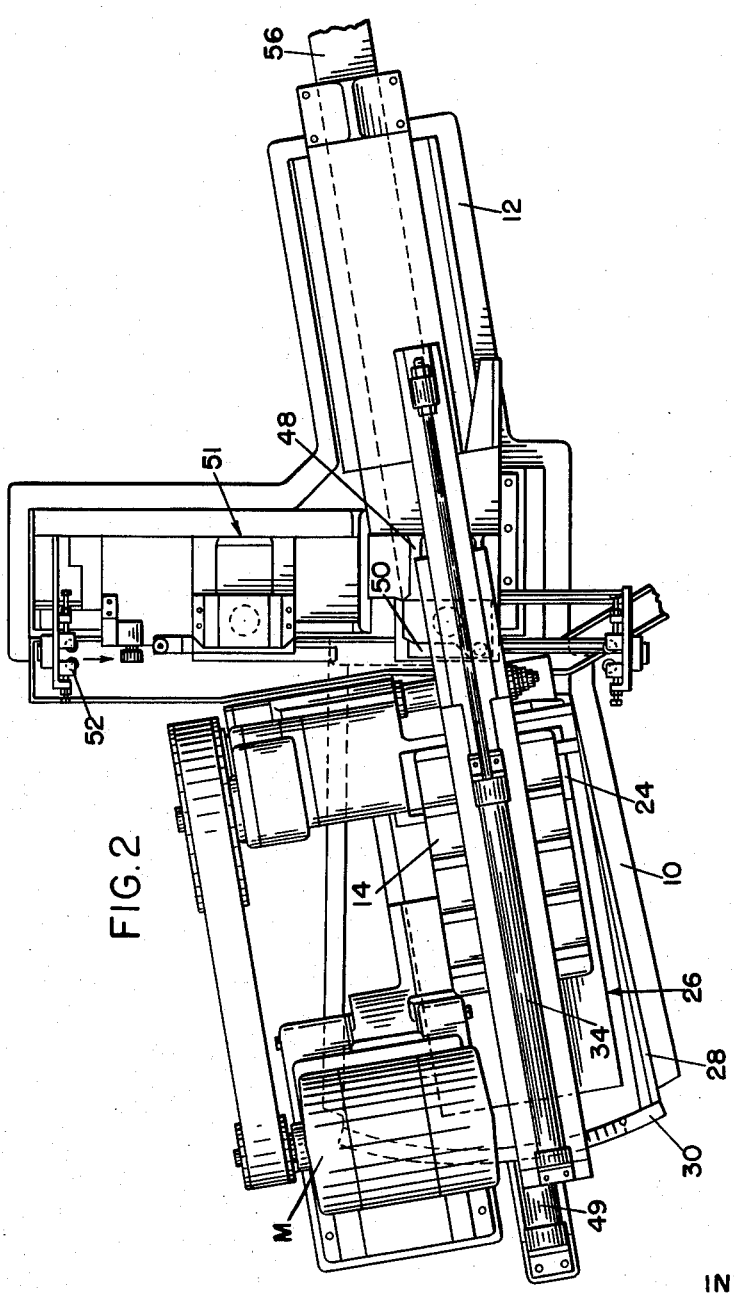
Fig. 2 is a top plan view thereof.

Referring now to Figs. 1 and 2, the machine of the present invention may be mounted on any suitable base housing or the like generally indicated at 10. There are two main housings, one generally indicated at 12 to the right in Fig. 1, and the other indicated at 14 to the left in Fig. 1. The portion of the machine at 14 carries the cutter, means for driving the same and advancing it, and also the adjustment means for the cutter to vary the angularity of cut of the teeth of the band saw.

The portion marked 12 carries mechanism for feeding and mounting the saw blade blanks in a stack, and for clamping the same; and also provides for the burr plate and feed mechanism thereof.

The cutter is indicated by the reference numeral 16, see Figs. 1 and 10. This cutter is rotary, cylindrical, or tapered to suit conditions to be described, is mounted on vertically movable head 20 which also carries a work aligning member 21 horizontally adjustable by a ram 22. The head 20 may be traveled by a hydraulic cylinder 23.

The head 20 and appertenant parts are provided upon an upright standard or the like 24 of any desired or convenient construction, and this standard is mounted at its lower end on a table or the like generally indicated at 26. Table 26 is mounted for angular adjustment in a horizontal plane on a fixed bed 28. This adjustment is made in degrees according to a scale 30 and increases or decreases the angle of the hook of the teeth, Fig. 11.

The standard 24 may be adjusted to and from the stack of blades which is indicated at A in order to increase or decrease the size of teeth; but the pitch of the teeth milled by the cutter depends upon the form of the milling cutter itself which is shaped to form a plurality of teeth in the stack A and pass upwardly. The cutter must be tapered more, the greater the angle X in Fig. 11. The cutte rotates in a clockwise direction, see Figs. 1 and 10, and is what it is known as a "climb" milling cutter, so that it will be seen that the lowermost blade in the stack A if unsupported is apt to become distorted and a burr formed at the edge thereof, such burr necessarily being removed afterwards.

Various stops and clamp assemblies, etc., are provided but they form no particular part of the present invention and may be conventional types. The milling cutter itself may be driven in any way desired as by means of an electric motor M or the like. However, it is pointed out that as the piston 29 for cylinder 23 rises, in moving the cutter past the work, its head 31 engages at its top edge an elongated horizontal wedge generally indicated at 32, the hydraulic cylinder 34 extends the non-overhauling wedge outward at a predetermined rate, thus prevening the milling head from climbing the work, thereby insuring smoothness of the cutting action. At the top of the stroke, valves not shown are automatically actuated to cause a hydraulic cylinder 34 to retract the wedge to the left for the next stroke, as the piston retreats to downward position.

The angularity of adjustment of the milling cutter demands a replacement of cutters. A cylindrical milling cutter would of course be used if the deviation from a right angle with respect to the stack of blades is zero. However, if the deviation is ten degrees, obviously a special tapered cutter is necessary and at any adjustment inbetween, a different cutter is necessary to be applied to the machine, so that the periphery of the cutter will always be parallel to the stack of blades, i.e., to the blanks being fed in to the machine.

The stack of blades is provided with pivoted clamping means of lever type at either side of the cutter as indicated at 40 in Figs. 3 and 4, and these clamping and positioning fingers may be actuated in any way desired, as for instance by hydraulic cylinders or the like operating in timed relation to the cylinder 23. For instance, the cylinder C operates a crank 37, oscillating the same and its shaft 39, Fig. 9, in turn reciprocating a bar 41 mounting a pair of rods 43 connected to the clamping levers 40. Also, a top clamp is provided on the stack of blades as at 42, and this again may be operated in any way desired as by a hydraulic cylinder.

The blades are mounted to travel toward the observer in Figs. 3 and 10 intermittently after each pass of the milling cutter. A block 44 is accurately horizontally adjusted to and from the cutter by means of an adjustment device 46 which adjusts the entire knee 48 upon which the clamp 42, block 44, etc. are mounted. The blades travel along a support 50 and of course have to be adjusted so that they extend outwardly to the left beyond support 50, Fig. 4, sufficiently to allow for the milling action and forming the teeth at the left-hand edge as seen in Fig. 3 with relation to the stack A. The adjustment of block 44 provides for any width of blade to be milled.

The operation of the machine is that the stack of blades whatever their number are advanced from left to right as in Fig. 4 or toward the observer in Fig. 3, this advance being provided by indexer 51 intermittently in timed relationship to the pasage of the cutter which, as stated, travels upwardly from its bottom position to its top position, forming a series of teeth in each blade in the stack A by the single passage thereof.

When the cutter has returned to its original postion, or during the return thereof, the blades are advanced one step so that if a dozen teeth are milled at one pass, the stack of blades is automatically advanced to position where the next stack of blades is to be milled, and the cutter once more makes the pass as above described. All of this action is provided for automatically, as well as backing the cutter off during the return stroke, by retracting the frame 14 by a cylinder 49, and the machine may continue as long as the reels of band material lasts, whereupon the reels must be replenished for further continuous operation.

Referring now to Fig. 2, an indexing clamp assembly is illustrated generally at 51 and there is a guide-roll assembly at 52 which guides the stack of blades in the direction of the arrow toward the clamping mechanism adjacent the turret. The indexing mechanism at 51 does not for many particular part of the present invention, but it will be obvious that this indexing must be accurate in order to provide for an accurate spacing of the teeth of the band saw from cut-to-cut of the milling cutter.

As the milling cutter passes upwardly, it distorts or burrs particularly the teeth or the points of the teeth of the lowermost band saw blade in the act of forming the same, and turns the same downwardly, forming a downwardly extending burr thereon at the forward edge thereof being worked.

The burring plate is indicated by the reference numeral 56 and it is positioned at in this case eleven degrees with reference to a normal line drawn with respect to the advancing stack of saw blades. This is one degree more than the extreme adjustment of ten degrees which is illustrated with respect to the adjustment for the cutter, Fig. 11, and this is for providing positively a little extra material to be cut by the cutter from the burring blade at each passage of the cutter therepast. The burring blades underly the stack of cutters which are clearly shown in Fig. 1. If the angle X in Fig. 11 is ten degrees, then the angle Y is one degree.

Referring now to Figs. 5 to 7 inclusive, the indexing mechanism for the burr plate is illustrated herein and this comprises in the first place a screw shaft generally indicated at 58 properly journaled in the frame of the machine and being intermittently rotated in timed relation with respect to the passage of the cutter by means of a ratchet 60 provided with a pawl 62, the latter being mounted on a block 63 operated by a link 64, see Fig. 7. This screw 58 is in mesh with a nut 66 having projections 68 which cooperate with clamping means 70 to hold burr plate 56 to nut 66. As the screw 58 turns, the burr plate is therefore fed forwardly according to the intermittent motion derived from the pawl 60, and the advance of the burr plate is therefore step-by-step between the working or feed strokes of the cutter itself so as to advance the burr plate a very small increment between each cut, thus providing at all times a clear support for the lowermost blade blank in the stack A. Different widths of burr plates may be used with the clamping means 70 for this purpose.

The link 64 is operated by any means operated in timed relation to the blank feed means and the cutter reciprocating means in order to advance the burr plate e.g. .001" at each step, and thus always present a fresh edge to the stack A and to the cutter.

Reference is now made to Fig. 8 showing guides therein for adjustably mounting or guiding the burr plate at a fixed angle of 11° to the stack of blades as explained above. The guide members at 80, 82 are adjustably mounted in the side of the machine, as for instance by screws 84, 86 respectively, and thus it will be seen that the burr plate is guide along in an inclined path which is adjustable to take any size of burr plate, i.e., width, which may be desired, depending upon the width of the cutter that is used.

Although the angle of the tooth-forming cutter may be varied, as for instance between zero and ten degrees with respect to the normal line indicated at Z in Fig. 11, with respect to the line of advance of the blades in the stack at A, the burr plate is fixedly maintained at eleven degrees which is, of course, one degree greater than the greatest possible adjustment of the cutter. Thus, regardless of the adjustment of the cutter, that is, from a right angle to the blades being cut, to the full ten degree adjustment, the burr plate is nevertheless at a greater angle to the blades. Therefore, when the cutter shapes the teeth, as for instance to the hook shape shown in Fig. 11, and the burr plate is advanced as for instance on the order of a thousandth of an inch, then the burr plate will extend beyond the next projected cut at all points along the cut outline. This in turn ensures that there is always an underlying support for the lowermost blade in the stack of blades A, even though the teeth should be provided with a relatively great hook. There is no need to adjust the burr plate angularly corresponding to the adjustment of the cutter as long as the burr plate is maintained at a greater angle than the greatest possible angle of adjustment of the cutter.

The invention above described provides for all of the blanks in the stack A to be operated upon substantially uniformly and without the necessity of providing any deburring operation on any one of the blanks of the stack. Therefore this de-burring operation heretofore necessary is done away with and the blades are manufactured faster and with less attention on the part of the operator and the blades can be made faster and less expensively than in the prior art.

Having thus described my invention and the advantages thereof, I do not wish to be limited to the details herein disclosed, otherwise than as set forth in the claims, but what I claim is:

1. A machine for forming teeth in saw blades comprising a base, an upright standard thereon, a rotary toothed cutter mounted for vertical reciprocation on the standard, means driving the cutter, means reciprocating the same on its vertical path, a second standard, means for horizontally feeding and clamping an elongated saw blade blank on said second standard in position to be acted upon by said cutter to form the teeth, means for positioning the axis of said cutter at an angle to the longitudinal axis of the saw blade blank, means adapted to underlie the saw blade to protect the same against burring upon action by said cutter, and means for feeding said last-named means in a direction to slightly overlap the saw blade blank at the portions thereof cut by said cutter in the shape of the saw teeth.

2. The machine according to claim 1 wherein said burr protection means includes a flat plate and the means for feeding the same includes means for indexing said flat plate in a direction to present a new bearing surface to the teeth of the cutter at each reciprocation of the cutter.

3. A machine of the class described comprising a support, a milling cutter thereon, means for driving said milling cutter, means feeding and clamping a saw blade blank intermittently in position to be acted on by said cutter to tooth the blank, means relatively feeding said cutter and blank for forming the saw teeth on the blank, and means associated with said saw blank in flat contacting relationship therewith preventing burring of the teeth as they are formed on the blank by said cutter, the rotation of the cutter being in a direction opposite the relative motion of cutter and blank at the point where the teeth are formed in the blank.

4. Apparatus of the class described comprising a base, a toothed cutter thereon, means mounting said cutter for rotation and travel in a direction generally in the plane of the axis of the cutter, means feeding and clamping a band saw blank in position to be operated upon by the teeth of the cutter to form saw-teeth therein, and a burr plate in close association and flatwise contact with said blank, said burr plate being located in position to prevent burring of the saw-teeth as they are formed by the cutter, means rotating the cutter in a direction for climb milling, the direction of the cutter on the feed stroke being vertical and the burr plate being in contact with said blank at the side thereof from which the teeth of the cutter emerge as the teeth are formed.

5. Apparatus of the class described comprising a base, a toothed cutter thereon, means mounting said cutter for rotation and travel in a direction generally in the plane of the axis of the cutter, means feeding and clamping a band saw blank in position to be operated upon by the teeth of the cutter to form saw-teeth therein, and a burr plate in close association and flatwise contact with said blank, said burr plate being located in position to prevent burring of the saw-teeth as they are formed by the cutter, means indexing the burr plate inwardly toward the milling cutter to provide a fresh supporting surface for the next set of teeth as they are formed, the burr plate also being milled by the teeth of the cutter into saw-toothed shape.

6. A machine of the class described comprising a base, an upright standard thereon, a cylindrical milling cutter mounted on said standard, means for reciprocating said milling cutter and rotating the same, means holding a saw-blank in position to be operated upon by the milling cutter to form teeth in an edge thereof, the axis of the cutter being positioned at an inclination with respect to the longitudinal axis of the blade blank whereby undercut teeth are formed in said blank, a burr plate mounted in flatwise relationship in contact with said blank and preventing burring of the saw-teeth as they are formed by said cutter, said burr plate being located at an angle with respect to said blank, said angle being generally the same as the inclination of said cutter axis with respect to said blank 7. A machine of the class described comprising a base, an upright standard thereon, a cylindrical milling cutter mounted on said standard, means for reciprocating said milling cutter and rotating the same, means holding a saw-blank in position to be operated upon by the milling cutter to form teeth in an edge thereof, the axis of the cutter being positioned at an inclination with respect to the longitudinal axis of the blade blank whereby undercut teeth are formed in said blank, a burr plate mounted in flatwise relationship in contact with said blank and preventing burring of the saw-teeth as they are formed by said cutter, said burr plate being located at an angle with respect to said blank, said angle being generally the same as the inclination of said cutter axis with respect to said blank, the burr plate being set at a slightly greater angle with respect to the longitudinal axis of said blank than is the cutter.

8. A machine of the class described comprising a base, an upright standard thereon, a milling cutter mounted on said standard, means for reciprocating said milling cutter and rotating the same, means holding a saw-blank in position to be operated upon by the milling cutter to form teeth in an edge thereof, the axis of the cutter being positioned at an inclination with respect to the longitudinal axis of the blade blank whereby undercut teeth are formed in said blank, a burr plate mounted in flatwise relationship in contact with said blank and preventing burring of the saw-teeth as they are formed by said cutter, said burr plate being located at an angle with respect to said blank, said angle being generally the same as the inclination of said cutter axis with respect to said blank, the burr plate being set at a slightly greater angle with respect to the longitudinal axis of said blank than is the cutter, and means for intermittently feeding said burr plate toward said cutter, providing a fresh burr plate surface at each cut, so that there is always a fresh supporting surface on said burr plate.

9. A machine of the class described comprising a base, an upright standard thereon, a milling cutter on said standard, means to rotate the cutter, means to feed the cutter in a reciprocatory path, means to intermittently feed and clamp a stack of band saw blanks on said machine in position to be cut by said cutter to form band saw teeth therein, the axis of said cutter being inclined with respect to the longitudinal axis of said blanks to provide for forming hook teeth in said band saw blades, and a burr plate located under the stack of band saw blade blanks, said plate being in position to also be cut by said cutter, and means indexing said burr plate slightly forwardly towards the cutter at each step in the feed of the band saw blanks.

10. A machine of the class described comprising a base, an upright standard thereon, a milling cutter on said standard, means to rotate the cutter, means to feed the cutter in a reciprocatory path, means to intermittently feed and clamp a sack of band saw blanks on said machine in position to be cut by said cutter to form band saw teeth therein, the axis of said cutter being inclined with respect to the longitudinal axis of said blanks to provide for forming hook teeth in said band saw blades, and a burr plate located under the stack of band saw blade blanks, said plate being in position to also be cut by said cutter, and means indexing said burr plate slightly forwardly towards the cutter at each step in the feed of the band saw blanks, said burr plate being located at an inclination with respect to the line of feed of said band saw blanks.

11. The machine of claim 10 wherein said cutter is also inclined with respect to the feed of the band saw blanks, the inclination of the burr plate being slightly greater than the inclination of the axis of the cutter with respect to the band saw blanks.

References Cited in the file of this patent

UNITED STATES PATENTS

| | | |
|---|---|---|
| 1,250,377 | Stevens | Dec. 18, 1917 |
| 1,372,738 | Bjornberg | Mar. 29, 1921 |
| 1,480,627 | Muller | Jan. 15, 1924 |
| 1,954,535 | Olsson | Apr. 10, 1934 |
| 2,850,927 | Grinnel | Sept. 9, 1958 |